Dec. 30, 1969     A. K. G. KORZILIUS     3,486,369
METHOD AND APPARATUS FOR MEASURING THE MASS PER UNIT
LENGTH OF ELONGATED PRODUCTS
Filed May 6, 1966

INVENTOR
ADRIANUS K. G. KORZILIUS

BY *Stevens, Davis, Miller & Mosher*
ATTORNEYS

United States Patent Office 3,486,369
Patented Dec. 30, 1969

3,486,369
METHOD AND APPARATUS FOR MEASURING THE MASS PER UNIT LENGTH OF ELONGATED PRODUCTS
Adrianus K. G. Korzilius, Velp, Gelderland, Netherlands, assignor to American Enka Corporation, Enka, N.C., a corporation of Delaware
Filed May 6, 1966, Ser. No. 548,316
Claims priority, application Netherlands, May 8, 1965, 6505866
Int. Cl. G01n *29/00;* G01m *7/00*
U.S. Cl. 73—67.2   25 Claims

ABSTRACT OF THE DISCLOSURE

A method for measuring the count of a yarn automatically in which a portion of the yarn is clamped at two points and caused to vibrate at a resonance frequency, the tensile force applied to the vibrating yarn portion is varied while simultaneously keeping the thread portion in resonance until the resonance frequency equals a specified resonance frequency and the tensile force applied at that particular residence frequency is determined and is used as a measure of the yarn count. An apparatus for carrying out this method is also disclosed.

---

Figure 1:
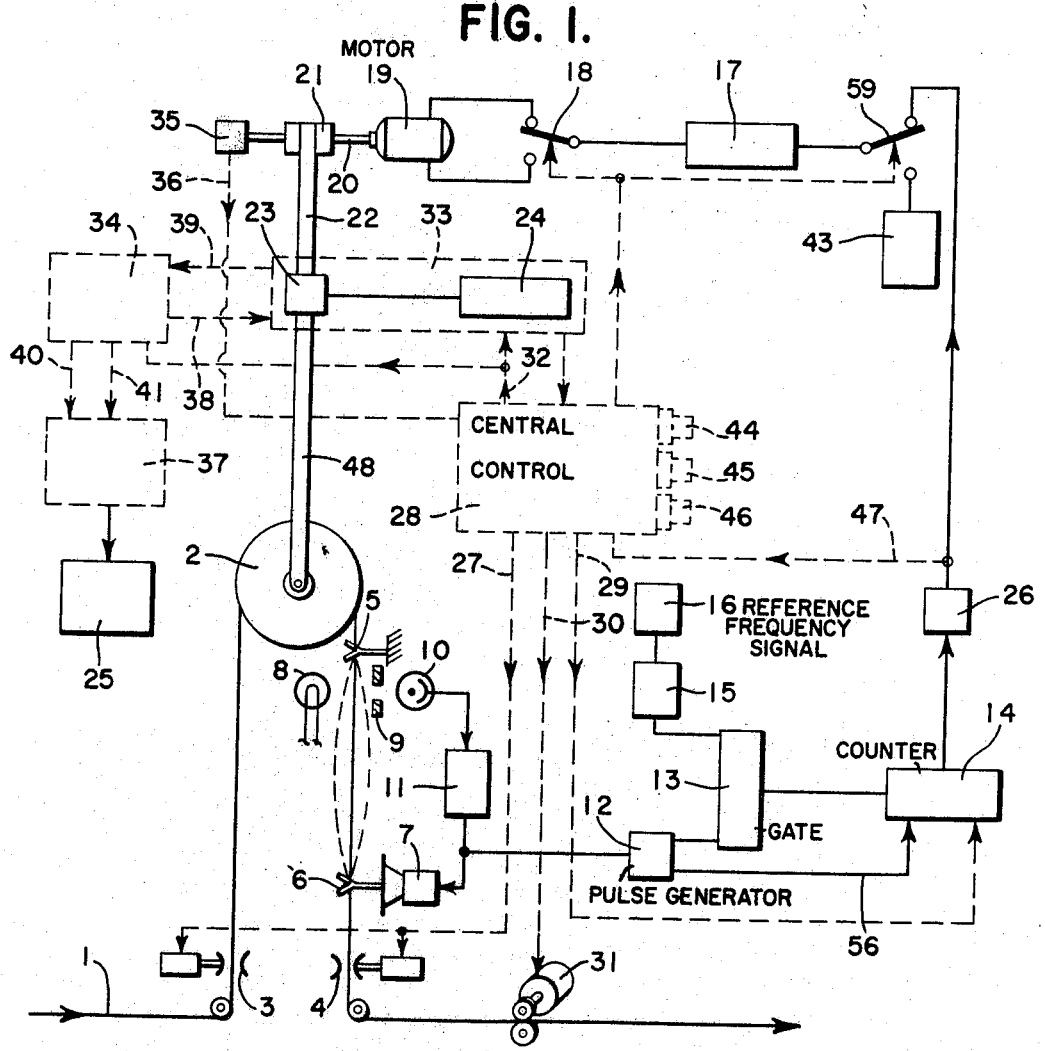

This invention relates to a method for measuring the mass per unit length of thread, yarn, wire or other like elongated products. More particularly, this invention relates to a method for automatically measuring yarn count by which the yarn portion to be tested is caused to vibrate and to the apparatus for effecting the method.

By the known methods of this type the mass per unit length or linear density of a thread is measured by causing vibration of a predetermined length of thread, while loaded with a predetermined weight and by measuring its resonant frequency.

The relationship between the resonant frequency $f$, the length $l$ of the vibrating thread portion, the tensile force $s$ exerted thereon, and the linear density $m$ for the fundamental mode is given by the following equation:

(I) $$f = \frac{1}{2l}\sqrt{\frac{s}{m}}$$

Equation I holds true if the length $l$ is much greater than the diameter $d$ of the thread. If this requirement is not satisfied, use must be made of a correction factor which is dependent on $l$, $d$, $s$ and the modulus of elasticity of the thread. A further requirement for the validity of Equation I is that the amplitude of the vibration should be relatively small.

Since the length $l$ of the vibrating thread portion is known, and the tensile force $s$ is defined by the known weight, the linear density $m$ may be expressed in the resonant frequency $f$. Moreover, a frequency meter may be calibrated to read in the desired units. For threads made of a textile material it may be calibrated to read, for instance, in denier, the unit in which the count, i.e., the weight of a specified thread length, is often expressed.

This known method has the disadvantage that the quantity $m$ is inversely proportional to $f^2$, that is, the square of the measure resonant frequency. The measuring sensitivity, i.e., the influence of a change in the linear density $m$ on the frequency $f$, may be expressed in the differential quotient shown in the following equation:

(II) $$\frac{df}{dm} = \frac{-\sqrt{s}}{4lm\sqrt{m}}$$

This equation shows that, as $m$ is higher, a change in $m$ results in a smaller change in $f$, it being assumed that the quantities $s$ and $l$ are constant. Therefore, under these conditions there is a decrease in the sensitivity with which $m$ is measured, and hence in the accuracy of the density values obtained. In order to maintain the measuring sensitivity constant, $s$ and/or $l$ would have to be chosen in dependence on $m$. To this end it would be necessary first to measure $m$ and then to determine from the result obtained the value of $l/\sqrt{s}$, required for a desired sensitivity $df/dm$. Subsequently, $s$ and $l$ would have to be set accordingly and the measurement be repeated.

If it should be desired to maintain the length $l$ constant, it would be necessary to choose a different weight. Such a measuring method is very cumbersome. It would be possible to carry out only one measurement by estimating the value of $m$ and choosing an appropriate weight.

However, if it is desired that the frequency meter be scaled in linear density, then a choice can be made from only a limited number of weights. This limitation results because a separate scale would have to be provided for each of the weights; unless use were made of weights forming a geometric progression having a common ratio 100, and in which case the place in the reading of the decimal point would depend on the weight used. Such a rough method, however, is inadequate. On the other hand, the use of several scales on one and the same indicating instrument enhances the chance of reading errors.

Another conceivable solution consists in that the quantities $l$ and $s$ are maintained constant, but are so chosen that even for high values of $m$ an acceptable minimum sensitivity $df/dm$ is obtained.

In accordance with Equation II the minimum sensitivity will be higher as $s$ is higher and $l$ is smaller. It will be clear, though, that this solution offers limited scope. In the first place a high value of $s$ cannot be used, since the tensile force may be too high for threads having a relatively low density. Moreover, the choice of $l$ is limited too. If the length $l$ is chosen to be small, insofar as this is still compatible with the requirement $l \gg d$, the measurement obtained or the measuring results are only indicative of the density of a correspondingly small portion of the thread. A choice must therefore be made between a high sensitivity with a small length $l$ on the one hand, and a lower sensitivity with a larger length $l$ on the other.

Advantageously, this invention provides a method for measuring the mass per unit length of a thread or the like which obviates the drawbacks of the known methods such as enumerated above.

This invention thus contemplates a method for measuring the mass per unit length of a thread in which the thread portion being tested is caused to vibrate so that frequency of the vibration is at all times equal to that of the fundamental mode or the same multiple thereof, the tensile force on the thread portion under test is varied until it is in vibration at a specified frequency, and the tensile force exerted is determined and is used as a measure of the mass per unit length of the thread.

In accordance with this invention it has been found that when an electric signal representing the vibration of the thread is produced, it is possible to determine the deviation of the vibration period of the thread from a fixed reference value with the aid of a frequency deviation meter. Such a meter may comprise two series resonant circuits combined into a bridge circuit, which are oppositely tuned with respect to the reference value. Because of its dependence on the deviation of the vibration period of the thread the tensile force may be so varied than that the thread portion under test vibrates at the desired frequency. In order to measure the tensile force more accurately, it is, however, preferred that the variation in the tensile force is controlled by the value obtained from the comparison between the period of the vibration of the thread and the period of a reference vibration derived from a vibration source of constant frequency.

Particularly accurate results are obtained by the method of this invention when the frequency of the reference vibration is high with respect to that of the vibration of the thread, and the comparison between the vibration periods is made by counting the number of periods of the reference vibration that fall in a given part of the period of the vibration of the thread. In this manner the deviation of the counted number from the number corresponding to the desired period of the thread vibration serves as a control value.

Furthermore in accordance with this invention the mass per unit length of portions of a thread that are relatively great distances apart, can be readily measured. For example, when a thread is supplied from a package, it is preferred that during a measurement to determine the count of one portion of the thread, additional thread is fed from the point of supply, and that between the vibrating thread portion and the point of supply a part of the thread is cut off. The length of the cut-off part is selected to be at the most equal to the distance between the two yarn positions to be tested. Then the resulting free end of the vibrating thread portion is joined to the free end of the thread fed to the apparatus from the point of supply. With this procedure, measurements of two different thread portions can be carried out practically in immediate succession.

An apparatus for carrying out the method of this invention preferably comprises a thread-vibrating means to effect vibration of a thread portion to be tested, means for deriving an electric signal from the motion of the thread, the frequency of the signal corresponding to the frequency of vibration of the thread, tensioning means for setting the tensile force on the vibrating thread portion, measuring means for measuring the tensile force on the vibrating portion of the thread, a vibrating source which produced a reference vibration, and comparator means for comparing the reference vibration with the electric signal derived from the vibration of the thread which emits an output signal that is dependent on the result of the comparison and that serves to control the tensioning means.

The measurements obtained by the measuring means may be made visible, if necessary at some distance in analogue form, for instance with the aid of an indicating measuring device and/or be registered with the aid of a recording device, or serve to control the adjustment of some process parameter. In connection with the processing of the measurements obtained, use may be advantageously made of an apparatus in which the means for measuring the tensile force on the vibrating thread portion comprises an analogue-to-digital converter connected to the output of a force transducer. Thus, digital data processing offers advantages with regard to storage of information, the processing of the measurements obtained with the aid of computers and the transport of information. The analogue-to-digital converter may control, for instance, a readout in the form of a punching machine or an electrically operated typewriter.

An electronic digital voltmeter may be used as an analogue-to-digital converter. However, if it is desired to obtain a high degree of accuracy, such an apparatus is relatively costly. The required accuracy may also be obtained using less costly means. For example, the analogue-to-digital converter used for measurement of the electric signal emitted by the force transducer may comprise a self-compensating bridge with a movable part for setting up the bridge equilibrium which is mechanically coupled with an encoder disk.

One very effective embodiment of the apparatus of this invention comprises in combination a vibration source which produces a square-wave reference signal having a frequency that is high with respect to that of the thread vibration, means for converting the electric signal derived from the thread vibration into a square-wave signal, a comparator comprising (1) a gate circuit, to which the square-wave signal and the square-wave reference signal are fed the on-time of the gate circuit coinciding with a positive or negative half-period of the thread vibration and the off-time with the following negative or positive half period, respectively, and (2) a counting device which emits an overflow signal when the pulses fed into it exceed a given number, and which, during the off-time of the gate circuit, is reset to its initial position by the square-wave signal derived from the thread vibration, and a univibrator which is controlled by the output of the counting device and which, when it receives input signals during the on-time, produces not more than one pulse (which will hereinafter be referred to as marker pulse), and tensioning means including a tensioning member which is (1) movable stepwise and (2) coupled with the thread, and which, starting from an initial position, may be brought under the influence of the marker pulse in any one of a number of discrete positions.

As a tensioning member that is movable stepwise an electric stepping motor may be used.

In order that the thread may be again allowed to relax there are preferably provided an electric stepping motor whose direction of rotation may be reversed and a reset device which aids in resetting the stepping motor to its initial position.

One effective arrangement is obtained when the reset device comprises a pulse generator means, a reversing switch for reversing the direction of rotation of the electric stepping motor and for feeding the pulses produced by the pulse generator means, to the stepping motor, and a limit switch which co-operates with the stepping motor and ensures that it is not reset beyond its initial position.

In order to maintain the thread portion being tested in vibration it may be located between two plates of a capacitor, having a nonhomogeneous field between its plates. By converting the changes in capacity into changes in voltage an electromechanic resonance system, which strikes the thread, is produced.

A simpler construction is obtained, however, when the resonance system comprises a light source directed onto the thread, a photoelectric pick-up, an amplifier for amplifying the electric signal emitted by the pick-up and a vibrating means which is controlled by the amplifier and which has a vibrating member that strikes the thread.

With this embodiment of the resonance system a particularly effective construction is obtained when the means that derives an electric signal from the motion of the thread is comprised of the light source, the photoelectric pick-up and the amplifier.

Furthermore, for limiting the amplitude of the thread vibration there are provided a photoelectric pickup and a light source which is directed on the thread so that its light beam is intersected by the thread when it vibrates at its maximum amplitude whereby the signal emitted by the photoelectric pick-up reduces the amplifying action of the amplifier.

The tensile force on the vibrating portion of the thread may be set by clamping the thread at two points, the distance between the points being adjustable. Preferably the tensioning means used by the present invention comprises a rotatable guide member around which the thread is wrapped, a coupling device which couples the guide member in freely rotatable manner with the tensioning member for setting the tension, two clamps, each of which may be clamped onto the end of the thread suspending from the guide member, and guide elements that bound the vibrating thread and which are located between one of the clamps and the guide member.

Any thick sections of the thread must not cause it to break when they pass through the clamps. To prevent such breakage a safety mechanism may be provided just forward of the clamps. One such mechanism has a hinged arm that causes the thread to move sideways as soon as a knot passes. In this manner, a knot may be guided around the clamps.

This problem may also be solved without using any moving parts. For example each clamp may be provided with a guiding device which has a slit of constant width that is open on at least one side through which the thread is allowed to pass before it is guided through the clamp. The slit is positioned so that it makes an acute angle with the direction of travel of the thread at that point where the thread is allowed to pass.

A very simple guiding device consists of two parallel pins between which the thread is guided.

The tensile force on the thread is preferably converted into an electric signal. In order to obtain the signal, the coupling device may be provided with a magnetic core which is coupled on the one hand with the rotatable guide member and on the other hand, by way of a spring, with the tensioning member. A fixedly mounted and properly dimensioned core may be provided around the core so that its self-induction changes as a function of the position of the core. The relationship between the position and the tensile force applied is given by the spring characteristic. The coupling device may also comprise a capacitor consisting of two plates which are movable relative to a common housing under the action of a spring, one plate being coupled mechanically with the tensioning member, and the other with the rotatable guide member.

A particularly effective arrangement is obtained by use of a coupling means which comprise an elastic coupling member having strain gauges which are part of an electric bridge circuit and which form the force transducer. For instance an elastic strap may effectively be used as a coupling member.

A very sensitive force transducer for obtaining reproducible conversion can be produced by a coupling member having a particular construction. Thus, it has been found that such coupling member is formed by a frame which is shaped as a 2n-sided, symmetrical polygon, that is a polygon having an even multiple of sides. Moreover, at least two sides of the polygon that are symmetrical with respect to the center are flexible and the other sides are rigid. The external forces exerted on such a coupling member are arranged to act in opposite directions along one and the same line passing through the center and to act on two angular points which are located on one and the same line passing through the center, to which line, on opposite sides thereof, there connect flexible sides, each of which carries on either side a strain gauge. The frame may be made of metal, plastic or the like.

With this embodiment it is the flexure of the elastic or flexible sides that governs the sensitivity of the force conversion. However, this flexure may be made large by choosing elastic sides as long as possible, with the flexural deformation still being within the range of proportionality.

A very effective embodiment of the coupling member is obtained if it is formed by a rectangular frame. This frame may be composed of loose parts. However, in order to obtain the greatest possible reproducibility of the force conversion, the frame is preferably made in one piece.

The most favorable position of the force transducer is obtained when the two pairs of strain gauges (each of which is mounted on a flexible side) are positioned near the angular points of the frame since the flexural stresses are highest in these locations.

When the mass per unit length of portions of a thread which are spaced at given intervals is to be measured and the thread is supplied from a package, the thread may be unwound and the portions to be tested may be cut off. If necessary, these portions may then be marked, after which they may successively be mounted in the vibration system and tested. In such cases a more rapid way of carrying out the measurement, which does not require separate mounting of the loose thread portions involves the use of a transfer device, with which the portions of the thread to be tested are successively transferred to the vibration system. Moreover, the thread portions tested need not be marked, since it is sufficient to record the number of the measurement.

The transfer of the thread and the various stages that can be distinguished in a measuring cycle might be carried out programmatically by manual control. However, in order that the program may be performed partly or fully automatically, it is preferred, both for an analogue and for a digital representation of the tensile force, to construct the apparatus so that it includes a central control means for programmatically performing the transfer of the thread and the various stages of a measuring cycle.

When the tensile force is digitized, then it is preferred to use a parallel serial converter that is controlled by the central control means. In such an embodiment after the control means has emitted a signal, the decades of tensile force expressed in digits are fed by the converter one by one to a readout.

In accordance with this invention the limit switch emits a start signal, which indicates that the stepping motor has reached its initial position and which is transmitted to the central control means. Then the control means effects the transfer of a following thread portion to be tested to the resonance system and also blocks the counting device. After the thread has been transported, blocking of the counting device is removed by the central control member. In this way a greater adaptability is achieved, since the resetting of the stepping motor is more or less self-controlled in that there is always just sufficient time for the stepping motor to be reset.

According to the invention, the central control means comprises a primary timing circuit that is controlled by the marker pulses and that emits a signal if within a given time after the occurrence of a marker pulse no following marker pulse is received. This emitted signal cuts in the means for measuring the tensile force on the vibrating thread. The central control means also includes a secondary timing circuit which is started by the signal emitted by the primary timing circuit and which, after a given time delay, emits another signal which cuts in the parallel serial converter and turns the reversing switch which in turn, reverses the direction of rotation of the electric stepping motor.

Figure 2:
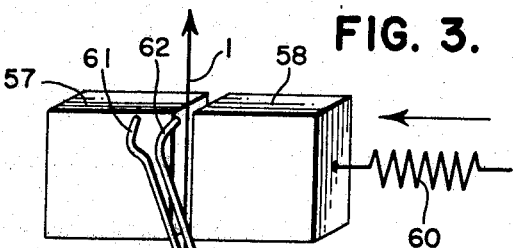
Figure 3:
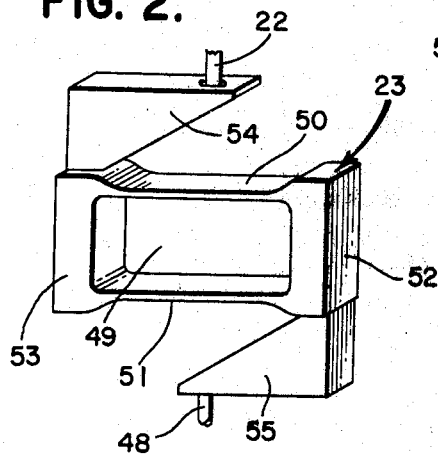

The invention will now be further described in greater detail with reference to the accompanying drawing, in which:

FIGURE 1 schematically shows an apparatus for measuring the mass per unit length of a textile thread; and FIGURES 2 and 3 show details of the apparatus of FIGURE 1.

A thread 1 supplied from a package (not shown) is passed, by means of a transfer motor 31, over a rotatably mounted guide member, comprising a rope pulley 2. In passing over the pulley, the thread runs through electrically operated clamps 3 and 4, respectively. During the measurement made in accordance with this invention, clamps 3 and 4 are closed and transfer motor 31 is inoperative.

Between the rope pulley 2 and the clamp 4 the thread 1 passes through two thread guides 5 and 6. The thread guide 5 is fixed, but the thread guide 6 forms part of the vibrator of an electromechanical vibrating system 7 and may move in a direction transverse to the thread. The vibrating symtem 7 may, for instance, be a loudspeaker having a voice coil coupled with the thread guide 6. At a point between the thread guides 5 and 6 the thread is in the light beam of a light source 8. After the light beam passes the thread and a stop 9, it is received by a photoelectric pick-up, such as a photoelectric cell 10.

The electric signal received from the photoelectric cell 10 is amplified in an amplifier 11. The output of the amplifier excites the vibrating system 7. In addition, means are provided (not shown in the drawing) to limit the amplitude of the thread vibration, in order that the relationship heretofore defined by Equation I may hold true. In this way it is further ensured that the frequency of the signal emitted by the amplifier 11 corresponds at all times to that of the fundamental mode of the thread or to the same multiple thereof. In the case when the frequency is a multiple of the fundamental mode the right-hand member of Equation I must be multiplied accordingly.

The means for limiting the amplitude may comprise a photoelectric pick-up and a light source directed thereon. When the light beam is intersected by the thread, which is the case when the latter vibrates at the greatest admissible amplitude, the pick-up limits a signal which reduces the action of the amplifier 11. Moreover, the output of the amplifier 11 is connected to a device 12, which converts the output signal of the amplifier into a square-wave signal. For the purpose of this invention a device of this type is referred to as pulse generator.

The output signal of the pulse generator 12 is fed both to an input of a gate circuit 13 and to a counting device 14. To another input of the gate circuit 13 is fed the signal emitted by a second pulse generator 15. The pulse generator 15 receives its input signal from a vibration source 16, which produces a reference vibration of high and constant frequency; for instance, a crystal vibrator having a frequency of 100 kilocycles per second. The counting device 14 may, for example, be a counter which produces an overflow pulse each time its counting capacity is exceeded or a preset counter, which reacts when a preset number of pulses has been fed to its input.

The overflow pulses emitted by the counting device 14 are fed to a univibrator (monostable multivibrator) 26. The univibrator, as soon as the first overflow pulse appears at the output of the counting device 14, emits a pulse, which will hereinafter be referred to as marker pulse. The marker pulses are fed via a commutator 59, an amplifier 17 and a reversing switch 18, to a device for tensioning the thread. Connected to one of the contacts of the commutator 59 is a low-frequency pulse generator 43.

The tensioning device comprises a tensioning member that is movable step-wise, and which preferably consist of an electric stepping motor 19. This motor controlled by the marker pulses, may be brought into any one of a number of discrete positions. The tensile force to be applied by the tensioning member 19 is transmitted to the thread in the following way:

Coupled with the shaft 20 of the stepping motor is a drum 21 to which is attached one end of a strip 22. At the other end of the strip 22 is a coupling member or device 23, the construction of which will be described more fully with reference to FIGURE 2. Connected with the coupling device is a suspension member 48, which soticsupports the rope pulley 2 that it is freely rotatable.

The coupling device shown in FIGURE 2 has elastic coupling member, which is preferably a rectangular frame 49. This frame is made in one piece and has two thin, flexible side elements or parts 50 and 51 and two rigid side elements or parts 52 and 53. Attached at two opposite angular points i.e., corners, of the frame are supports 54 and 55, respectively. The strip 22 and the suspension member 48 are coupled with these supports. However, it is also possible for the rope pulley 2 to be rotatably supported directly by the support 55 itself, instead of by the suspension member 48.

The construction of the coupling device is such that the lines along which the tensile force in the belt 22 and that in the suspension member 48 act, coincide, and pass through the center of the rectangular frame. Each of the flexible parts is provided with a strain gauge on its outer and inner faces (not shown in FIGURE 2), so that there are four strain gauges in all. These strain gauges form part of an electric bridge circuit that forms a force transducer, which converts the tensile force on the thread being tested into an electric signal. By preference, the two strain gauges provided on the parts 50 and 51 are attached thereto near the angular points of the frame, since at these points the flexure is greatest.

As further shown in FIGURE 1, the electric output signal of the force transducer is converted into a digital signal by means of an analogue-to-digital converter 24. The digital signal is, as hereinafter more fully described, fed to a readout 25. This may, for example, be a punching machine, which supplies the measurements obtained in the form of a punched tape, that may be used in further data processing.

A reliable, accurate, and economical construction for the analogue-to-digital converter is obtained when the output voltage of the force transducer is fed to a self-compensating bridge with a moving part for setting up the bridge equilibrium. The moving part may, for instance, be the sliding contact of a voltage divider, driven by a servo-motor, which is also coupled with an encoder disk.

Before the control mechanism shown in FIGURE 1 by dash lines is described in detail, the operation of the elements discussed so far will be explained.

Before measurement of the thread is started, the thread is only slightly tensioned and the clamps 3 and 4 are still open. The measuring cycle begins after the clamps have been closed. The thread portion between the thread guides 5 and 6 is caused to vibrate from the transverse movement of guide 6. The thread portion between the thread guides 5 and 6, together with the elements 5 to 11 inclusive, forms a resonant system in which its is in harmonic vibration; the nodes of the vibrating portion are located at the thread guides 5 and 6, and the anti-node is in the middle of the vibrating portion.

From the motion of the thread there is derived, with the aid of the resonant system, an electric signal of corresponding frequency. This signal is made available at the output of the amplifier 11. The pulse generator 12 converts this signal into a square-wave signal of the same frequency. The pulse generator 15, too, produces a square-wave signal, which is in this case derived from the reference vibration produced by the vibration source 16. The gate circuit 13 is on as long as the signal produced by the pulse generator 12 is in its, for instance, positive, half-period. During the on-time, which consequently corresponds with a half-period of the thread vibration, the pulses produced by the pulse generator 15 are allowed to pass to the counting device 14.

The counting device registers as many of the pulses from the pulse generator 15 as were allowed to pass in the on-time of the gate circuit. Since the thread is at this time still in the untensioned state, and the period of the thread vibration is relatively great, a relatively great number of pulses will flow to the counting device 14 during the on-time. As a result, the counting device, as soon as the number of pulses received at its input exceeds its preset value or capacity, will omit one or more overflow pulses. In general under usual operation, it is immaterial whether one or a plurality of overflow pulses are emitted, because the univibrator 26 produces a marker pulse of such a width that in the on-time of the gate circuit 13 only the first overflow pulse gives rise to the formation of a marker pulse. Subsequently, the marker impulse which is amplified in the amplifier 17 causes the stepping motor 19 to turn one step. It will be understood that before the measuring cycle is started, the switch 18 is turned into such a position that the step of the motor is made in the direction which tensions the thread.

In the subsequent negative half-period the counting devic 14 is, via the connection 56, reset by the signal of the pulse generator 12. During this negative half-period the stepping motor remains in its position. If after the above step the tensile force on the thread has increased insufficiently, then the number of pulses allowed to pass in the following on-period of the gate circuit 13 will again give rise to the production of overflow pulses. Then the univibrator 26 again gives off a marker pulse, which causes the stepping motor 19 to turn another step. During its following negative half-period, the output signal of the pulse generator resets the counting device to its initial position. Thus, by the method described it is continuously determined whether the period of the thread vibration deviates from a reference value that corresponds to the preset value or the capacity of the counting device 14. This procedure is repeated until the thread is subjected to a tensile force at which the period of the thread vibration corresponds to the reference value. At that moment the counting device 14 does dot give off an overflow pulse. The test result registered in the analogue-to-digital converter may then be read out.

It will be appreciated that the coupling between the rotor of the stepping motor 19 and the shaft 20 may be effected by means of a transmission mechanism. The increase in the tensile force on the thread may then be varied by the choice of the transmission ratio. The use of a stepping motor has an advantage over a tensioning member with continuously variable output position in that it ensures a well defined position of the drum 21 and hence a well defined tensile force on the thread.

Since the tensile force is adjusted in such a manner that during each period of the thread vibration the period is compared with the reference value, it will be understood that the count of the thread may be determined very rapidly. A further advantage of the method and apparatus of this invention is that the measurements obtained allow for easy comparison. This advantage is evident from the following; Internationally accepted rules for measuring the count of textile threads specify that the measurements shall be carried out at a given standard load of the thread. This standard load corresponds to the weight of 500 meters of the thread to be tested. Since the count is as yet unknown, the weight of 500 meters of the thread is also unknown. Therefore, the thread is subjected to a load that pertains to the nominal count. If this value, too, is unknown, the weight of 500 meters must be estimated. But a higher degree of accuracy may be obtained by first measuring the count on the basis of the estimated weight of 500 meters and then carrying out, on the basis of the weight of 500 meters calculated therefrom, a second, final measurement of the count.

With the method and apparatus of this invention, however, the tensile force on the thread, when the reference frequency is reached, is precisely equal to the standard load. This means that the measurements or measuring results obtained in this way allow for better comparison than those obtained using a nominal standard load.

If the thread portions of which the count is to be measured are spaced great distances apart, then the time required for transporting the thread between two successive measurements may be long relative to the measuring time proper. In order to obviate this drawback use is made of a procedure by which the thread is unwound from the package during a count determination. Since between the supply package and the test apparatus the thread passes through only a few thread guides or none at all, it may be unwound at a higher speed than when must be passed through the count-measuring apparatus and, possibly, other apparatus. After the thread has been unwound, such a portion of the thread between the package and the measuring apparatus is cut off that after the two free ends obtained have been joined, the following thread portion to be tested is only at a small distance from the test point. The thread ends may be joined by gluing or knotting them together by a knotting device. With the aid of this device the thread ends may be joined automatically. Also if the thread permits, the ends may be joined by tangling or gluing. In any event, the joint obtained is thicker than the rest of the thread and, upon passing through the thread clamps of the apparatus of this invention may lead to thread breakage.

Advantageously, the guiding device shown in FIGURE 3 obviates this drawback in that it guides any thick thread portions past the clamps. The figure shows a clamp which consists of a fixed part 57 and a movable part 58. When the clamp is closed, the movable part is moved against the action of a spring 60 in the direction indicated by the arrow. Located between the parts of the clamp is the thread 1. Provided in front of the clamp is the guiding device, which consists of two guide pins 61, 62, which project from the plane of the drawing and make an acute angle with the indicated direction of travel of the thread. The pins 61, 62 form a slit which is widened and open at the upper ends of the pins and through which the thread is guided before it is passed through the clamp. As shown in the figure, the guiding device may, for instance, consist of a U-shaped piece of smooth metal wire, the ends of which are bent from the plane of the U-portion. If the thread travelling in the direction indicated contains a knot, the knot will not be able to pass through the slit, but will be guided along the pins 61, 62 and past the clamps.

In contrast with the count measuring method by which thread portions are cut to specified lengths and weighed, the above described procedure used in the present method of measuring the count is non-destructive. Thus the method of the invention is particularly suitable to be automated.

The manner in which the measuring method of this invention can be carried out automatically with the aid of the control mechanism indicated in the drawing by the dash lines may be summarized as follows:

When, after a measurement has been carried out, and the thread is being transferred, the clamps 3 and 4 are kept open by the output 27 of the central control member 28. In addition also while the thread is being transferred the control member keeps the counting device 14 blocked in its zero position by way of the output 29. The parts 5 to 11, inclusive, of the resonance system, the pulse generators 12, 15, the vibration source 16, the gate circuit 13, the counting device 14, the univibrator 26 and the amplifier 17 may stand-by then, without the stepping motor 19 prematurely starting to turn.

When a sufficient amount of thread has been transferred, the control member 28, by way of its output 30, causes the transfer motor 31 to stop. When the new portion of thread to be tested is between the thread guides 5 and 6, the clamps 3 and 4 are closed by the output 27. Moreover, by way of the output 29 the blocking of the counting device 14 is removed. Then the overflow pulses and the marker pulses appear at the output of the counting device 14 and that of the univibrator 26, respectively. The marker pulses are fed not only to the amplifier 17, but also, by way of the line 47, to the control member 28. Provided in the control member there is a timing circuit (not shown), which is started at the same time the blocking of the counting device is removed.

After each marker pulse this timing circuit is reset and starts again. However, when, after a marker pulse has been emitted, some time passes without the timing circuit being reset, it emits by way of the output 32 of the control member a signal that switches in the combination 33 of the force transducer 23 and the analogue-to-digital converter 24. Concurrently therewith the timing circuit switches in a second timing circuit, which after a certain time delay that is sufficient to register the tensile force in the memory of the analogue-to-digital converter, emits a signal at the output 32. As a result, the encoder disk of the converter is locked in its latest position in which the test value is registered, the switches 18 and 59 are turned, and the parallel serial converter 34 starts operating. The switch 18 is then in a position which corresponds to an opposite direction of rotation in the motor. The pulse generator 43 now gives off pulses to the stepping motor 19, which cause it to rotate in the opposite direction. The thread is now gradually allowed to relax until a limit switch 35, which co-operates with the stepping motor 19, is actuated to stop the rotation of the stepping motor. The stepping motor is then in its initial position again.

The purpose served by the parallel serial converter 34 may appear from the following discussion: Let us assume that in the analogue-to-digital converter the decades of the measurements obtained are in some way binary-coded. When a binary code is used it is preferably a progressive code, which offers advantages when a binary encoder disk is applied. Now, if for instance, the measuring value is indicated in three decades, and each decade is represented by four binary digits (bits), then the decades are available in three groups of four bits each in parallel, i.e., simultaneously. However, many readouts, such as punching machines, require that the measuring value should be read out in series, i.e., decade after decade.

After the parallel serial converter has been switched in by the central control member 28, it indicates via the line 38 which (binary-coded) decade will be read out and when. This decade is, via line 39, the converter 34 and the line 40, fed to a device 37, in which power amplification and code conversion are effected before the pertinent decade is recorded by the punching machine. When all the decades have been read out, the converter 34 gives off, via line 41, a signal to the device 37 indicating that reading out has been finished. After the stepping motor has reached its initial position, the limit switch 35 emits a start signal to the central control member 28, which, as a result, again blocks the counting device 14, opens the clamps 3 and 4 and starts the thread transfer. The measuring cycle is now complete.

The measurement of a thread may be controlled automatically, as described above, or it may be controlled manually. Accordingly, member 28 is provided with a number of push-buttons 44 and 45, which initiate the thread transfer and the count measurement, respectively. Automatic measurement is started by pressing the button 46.

While the novel features of the method and apparatus of the invention have been described and pointed out in the appended claims, it is to be understood that various changes in procedure as well as modifications and alterations in construction may be made by those skilled in the art without departing from the spirit and scope of the invention.

What is claimed is:

1. A method for measuring the mass per unit length of a thread wherein the portion of the thread to be measured is placed under tension and caused to vibrate, which comprises causing the thread portion to vibrate at a resonance frequency which is at all times equal to that of the fundamental mode or the same multiple thereof; varying the tensile force on the vibrating thread portion and simultaneously limiting the amplitude of the thread vibration to a maximum admissible value to keep said vibrating thread portion in resonance until said thread portion vibrates at a specified resonance frequency; thereafter determining the tensile force exerted at said specified resonance frequency; and using the determined tensile force as a measure of the mass per unit length of the thread.

2. The method of claim 1 which further comprises measuring the period of the vibration of the thread portion, producing a reference vibration from a vibration source of constant frequency, the frequency of the reference vibration being high with respect to that of the vibration of the thread portion, counting the number of periods of the reference vibration that fall in a given part of the period of the vibration of the thread portion; and using the deviation of the counted number from the number corresponding to the desired period of the thread vibration as a control value to control the variation of said tensile force.

3. An apparatus for measuring the mass per unit length of a thread which comprises thread-vibrating means for causing a thread portion to be tested to vibrate in a selected manner, means for deriving an electrical signal from the vibration of the thread, the frequency of the signal corresponding to the frequency of vibration of the thread, tensioning means for varying the tensile force on the vibrating thread portion, measuring means for determining the tensile force on the vibrating thread portion, a vibration source which produces a reference vibration, comparator means in which the reference vibration is compared with the electrical signal derived from the vibration of the thread and which emits an output signal that is dependent on the result of the comparison, said signal serving to control the tensioning means whereby the tensile force is varied until the thread portion is in vibration at a specified frequency and the tensile force then obtained by the measuring means is a measure of the mass per unit length of the thread.

4. The apparatus of claim 3 in which the means for measuring the tensile force on the vibrating thread portion comprises an analogue-to-digital converter connected to the output of a force transducer.

5. The apparatus of claim 4 in which said converter receives a signal from said force transducer that is indicative of the tensile force on the vibrating thread portion and said analogue-to-digital converter comprises a self-compensating bridge having movable means for setting up the bridge equilibrium, said movable means being mechanically coupled with an encoder disk.

6. The apparatus of claim 3 in which said vibration source produces a square-wave reference signal the frequency of which is high with respect to that of the thread vibration, means for converting the electric signal derived from the thread vibration into a square-wave signal, said comparator means comprising (1) a gate circuit, to which gate circuit said square-wave signal and the square-wave reference signal are fed, said gate circuit having an on-time that coincides with a positive or negative half-period of the thread vibration and an off-time corresponding to the following negative or positive half-period, respectively, and (2) a counting device which, when a given number of pulses fed thereto is exceeded, emits an overflow signal and which, during the off-time of the gate circuit, is reset to its initial position by the square-wave signal derived from the thread vibration, a univibrator which is controlled by the output of the counting device and which, when during the on-time it receives input signals, produces not more than one marker pulse, and said tensioning means comprising a tensioning member which is movable stepwise and is coupled with the thread to be tested, and which, starting from an initial position, may be brought into a number of discrete positions under the influence of said marker pulse.

7. The apparatus of claim 6 in which said tensioning member is an electric stepping motor.

8. The apparatus of claim 7 in which said electric stepping motor has a direction of rotation that may be reversed.

9. The apparatus of claim 8 which further comprises a reset device for resetting the stepping motor to its initial position, said reset device comprising a pulse generator, a reversing switch for reversing the direction of rotation of the electric stepping motor and for feeding the pulses produced by the pulse generator to the stepping motor, and limit switching means operably associated with the motor for ensuring that the stepping motor is not reset beyond its initial position.

10. The apparatus of claim 3 in which the vibrating means comprises a light source directing a beam onto the thread, a photoelectric pick-up for emitting an electric signal in response to the light beam, an amplifier for amplifying the electric signal emitted by the pick-up and a vibrating system which is controlled by the amplifier and has a vibrating member that strikes the thread whereby said thread is caused to vibrate.

11. The apparatus of claim 10 which further comprises means for limiting the amplitude of the thread vibration, said means including a photoelectric pick-up and a light source, the light beam of said source being directed on said pick-up and being intersected by the thread when the latter vibrates at its maximum amplitude, said photoelectric pick-up emitting a signal to the amplifier, whereby the amplifying action of said amplifier is reduced.

12. The apparatus of claim 3 in which the means that derives an electric signal from the vibration of the thread is formed by a light source, a photoelectric pick-up and an amplifier.

13. The apparatus of claim 3 in which said tensioning means comprises a tensioning member for setting the tensile force on said vibrating thread portion, rotatable guide member around which the thread is wrapped, coupling means for coupling said guide member with the tensioning member, clamp means for clamping the ends of the thread wrapped around and suspended from the guide member, and guide elements that bound the vibrating thread portion located between one of the clamps and the guide member.

14. The apparatus of claim 13 in which each clamp has a guiding device that has a slit of constant width which is open on at least one side, and through which the thread to be tested is passed before it is guided through the clamp, said slit forming an acute angle with the direction of travel of the thread at that point.

15. The apparatus of claim 14 in which said guiding device consists of two parallel pins between which the thread is guided.

16. The apparatus of claim 15 in that the coupling member is formed by a rectangular frame.

17. The apparatus of claim 16 in which the frame is made in one piece.

18. The apparatus of claim 13 in which the coupling means comprises an elastic coupling member having strain gauges which are part of an electric bridge circuit and which form a force transducer for emitting an electrical signal indicative of the tensile force on said thread.

19. The apparatus of claim 18 in which the coupling member comprises a frame shaped as a $2n$-sided symmetrical polygon, said polygon having at least two flexible side elements and other rigid side elements, said frame being coupled to said guide member and said tension member so that the external forces exerted on the coupling member act in opposite directions along one and the same line passing through the center of the polygon and act on two angular points which are located on one and the same line passing through the center, to which line, on opposite sides thereof, there connect said flexible side elements, each of which carries on either side a strain gauge.

20. The apparatus of claim 19 in which the two pairs of strain gauges, each mounted on a flexible side element, are positioned near the angular points of the frame.

21. The apparatus of claim 3 which further comprises a transfer means for moving portions of the thread to be tested successively to the vibration system whereby the mass per unit length of portions of a continuous thread that are spaced apart at given intervals can be determined.

22. The apparatus of claim 21 which further comprises central control means for programmatically effecting the transfer of the thread and the various stages of the measuring cycle.

23. The apparatus of claim 21 which further comprises a parallel serial converter arranged to receive signals from said measuring means and controlled by a signal from said central control means, said measuring means comprising a device that emits signals which express the tensile force on the vibrating thread portion in digits, and said serial converter, upon receipt of a command signal from said control means, feeding out decades of the tensile force expressed in digits one by one to a readout.

24. The apparatus of claim 23 in which a limit switch emits a start signal to the central control means that indicates when the stepping motor has reached its initial position, said control means then effecting transfer of another thread portion to said vibrating means and also blocking the counting device, said blocking being removed by the central control means after the thread has been transferred.

25. The apparatus of claim 23 in that the central control means comprises a primary timing circuit controlled by the marker pulses from said comparator means, said control means emitting a signal if within a given time after the occurrence of a marker pulse no following marker pulse is received, said emitted signal cutting in the means for measuring the tensile force on the vibrating thread portion, said control means also comprising a secondary timing circuit which is started by the signal emitted by the primary timing circuit and which, after a given time delay, emits a second signal which cuts in the parallel serial converter so that the reversing switch reverses the direction of rotation of the electric steppng motor.

References Cited

UNITED STATES PATENTS

| 1,869,884 | 8/1932 | Curtis | 73—67.2 |
| 2,306,137 | 12/1942 | Pabst | 73—67.2 |
| 2,744,408 | 5/1956 | Seney | 73—67.2 |
| 2,970,479 | 2/1961 | Wikstrom | 73—514 |

JAMES J. GILL, Primary Examiner

HERBERT GOLDSTEIN, Assistant Examiner

U.S. Cl. X.R.

73—160